US012665882B2

(12) United States Patent
Theuerkauf et al.

(10) Patent No.: US 12,665,882 B2
(45) Date of Patent: Jun. 23, 2026

(54) GATEWAY AND METHOD FOR OPERATING A GATEWAY

(71) Applicant: Siemens Mobility GmbH, Munich (DE)

(72) Inventors: Klaus Theuerkauf, Magdeburg (DE); Christian Reusch, Hannover (DE); Florian Neumann, Vechelde (DE); Jasper Hagenbuck, Braunschweig (DE)

(73) Assignee: Siemens Mobiloty GmbH, Munich (DE)

( * ) Notice: Subject to any disclaimer, the term of this patent is extended or adjusted under 35 U.S.C. 154(b) by 320 days.

(21) Appl. No.: 18/345,109

(22) Filed: Jun. 30, 2023

(65) Prior Publication Data

US 2024/0007442 A1     Jan. 4, 2024

(30) Foreign Application Priority Data

Jun. 30, 2022     (EP) ..................................... 22182140

(51) Int. Cl.
*H04L 9/40*          (2022.01)
*H04L 12/66*         (2006.01)
(Continued)

(52) U.S. Cl.
CPC ............ *H04L 63/029* (2013.01); *H04L 12/66* (2013.01); *H04L 63/0884* (2013.01); *H04N 7/035* (2013.01); *H04W 76/10* (2018.02)

(58) Field of Classification Search
CPC ... H04L 63/029; H04L 12/66; H04L 63/0884; H04L 65/103; H04L 69/329; H04L 69/08;
(Continued)

(56) References Cited

U.S. PATENT DOCUMENTS 5,587,878 A * 12/1996 Tsai ........................... G06F 1/16
                                                            361/732
9,842,564 B2    12/2017 Shao et al.
                  (Continued)

FOREIGN PATENT DOCUMENTS

CN            112134792 A    12/2020
DE       102014011339 A1     2/2016
EP            2630773 A2     8/2013

OTHER PUBLICATIONS

Cenelec—European Committee for Electrotechnical Standardization: European Standard EN 50159.

*Primary Examiner* — Huan V Doan
(74) *Attorney, Agent, or Firm* — Laurence A. Greenberg; Werner H. Stemer; Ralph E. Locher

(57)          ABSTRACT

A gateway for connection to a closed network of a railroad technical system has a network adapter for establishing a network connection to an external network. A video signal adapter can establish a video signal connection to the railroad technical system, and/or a device signal adapter can establish a device signal connection to the railroad technical system. At least one conversion facility is connected to both the network adapter and the video signal transmitter and/or the device signal adapter and converts the video or device signal connection data of the railroad technical system into external network data. The gateway thus provides particularly secure access to the closed network of the railroad technical system. There is also described a method for operating a gateway for connection to a closed network of a railroad technical system.

15 Claims, 2 Drawing Sheets

(51) Int. Cl.
    *H04N 7/035*          (2006.01)
    *H04W 76/10*          (2018.01)
(58) Field of Classification Search
    CPC ......... H04L 67/12; H04L 63/02; H04N 7/035;
                                    H04W 76/10
    See application file for complete search history.

(56)                   References Cited

U.S. PATENT DOCUMENTS

2023/0281640 A1* 9/2023 Jordan ................... G07C 5/008
                                                   705/317
2023/0365174 A1* 11/2023 Zhang ................... B61L 23/041
2024/0083478 A1* 3/2024 Liu ........................ G06V 20/52

* cited by examiner

GATEWAY AND METHOD FOR OPERATING A GATEWAY

CROSS-REFERENCE TO RELATED APPLICATION

This application claims the priority, under 35 U.S.C. § 119, of European Patent Application EP 22182140, filed Jun. 30, 2022; the prior application is herewith incorporated by reference in its entirety.

FIELD AND BACKGROUND OF THE INVENTION

The invention relates to a gateway for connection to a closed railroad technical system network and a method for operating such a gateway.

Railroad technical systems, and here in particular the signaling technical systems, are subject to a high level of security, and hence special conditions, in order to prevent unauthorized access from outside. Here, so-called cybersecurity that is intended to prevent malicious access to the signaling technology plays a major role. For example, great importance is attached to a secure network architecture of the signaling technical systems as specified, for example, by the guidelines for a Category 2 network according to EN 50159. For example, according to these guidelines, the railroad technical system network is separated from other external networks and provided with very complex security so that the risk of unauthorized access to the railroad technical system network from outside can be classified as negligible.

Nevertheless, it is frequently advantageous to enable secure remote access to the railroad technical system. This can, for example, significantly reduce maintenance costs and possible downtimes of the railroad technical system. Attempts are sometimes made to implement such access by means of VPN tunneling techniques, but these cannot completely rule out malicious access.

SUMMARY OF THE INVENTION

It is therefore the object of the present invention to provide a gateway and a method of the type mentioned in the introduction that enables secure access to a railroad technical system network.

With the above and other objects in view there is provided, in accordance with the invention, a gateway for connection to a closed network of a railroad technical system, the gateway comprising:

at least one network adapter for establishing a network connection to a network that is external to the network of the railroad technical system;

at least one signal adapter, which is a video signal adapter for establishing a video signal connection to the railroad technical system and/or a device signal adapter for establishing a device signal connection to the railroad technical system; and a conversion facility connected to both the network adapter and the at least one signal transmitter, the conversion facility being configured to convert at least one of video signal connection data or device signal connection data of the railroad technical system into external network data.

In other words, the above and other objects of the invention are achieved by a gateway for connection to a closed railroad technical system network, with at least one network adapter for establishing a network connection to a network external to the railroad technical system network, with at least one video signal adapter for establishing a video signal connection to the railroad technical system, and/or with at least one device signal adapter for establishing a device signal connection to the railroad technical system, and with at least one conversion facility, which is connected to both the network adapter and the video signal transmitter and/or the device signal adapter and is embodied to convert video signal connection data and/or device signal connection data of the railroad technical system into external network data.

Furthermore, the object is achieved by a method for operating a gateway for connection to a closed railroad technical system network, wherein the gateway is embodied according to the invention, and, in the method, video signal connection data and/or device signal connection data of the railroad technical system is converted into external network data.

The solution according to the invention has the advantage that the gateway according to the invention does not require any external network access to the railroad technical system, but nevertheless video signals from the railroad technical system can still be transmitted in the external network. As a result, a high level of security for the railroad technical system is still ensured and therefore, for example, the Category 2 network status according to the standard EN 50159 can also be ensured.

During operation, the network adapter for the gateway according to the invention establishes a network connection to the external network to which, for example, a user wishing to establish secure access to the railroad technical system has access. This external network can, for example, be a company's closed Ethernet network or also the Internet.

During operation, the video signal adapter of the gateway according to the invention establishes a video signal connection to the railroad technical system. For this purpose, the video signal adapter can, for example, be embodied as an HDMI connector connected to the railroad technical system by an HDMI cable. HDMI connectors are widely used and offer many connection options within the railroad technical system.

During operation, the device signal adapter for the gateway according to the invention establishes a device signal connection to the railroad technical system. Herein, the device signal adapter can, for example, be embodied as a USB interface. Herein, USB is a widely used standard that provides many connection options for railroad technical systems by USB cable.

During operation, the conversion facility of the gateway according to the invention converts the video signal data and/or device signal data from the railroad technical system into external network data, which can be fed into the external network via the network adapter. The conversion facility causes a protocol break between the external network and the railroad technical system network. The protocol break means there is no direct connection between the external network and the railroad technical system network so that malicious access to the railroad technical system is prevented or at least unlikely. By means of the conversion facility, the gateway according to the invention emulates a display facility connected to the railroad technical system.

The basic concepts according to the invention can be developed by advantageous embodiments as described below.

For example, the conversion facility can also be embodied to convert external network data into video signal connection data and/or device signal connection data of the railroad technical system. This has the advantage that a user connected to the external network can perform operations on the railroad technical system by means of the video signal connection or device signal connection. Therefore, in this embodiment, by means of the conversion facility, the gateway according to the invention also emulates devices connected to the railroad technical system. The emulated devices are, for example, a keyboard, mouse or microphone. With this advantageous embodiment of the invention, it is possible to act in both directions, i.e., from the external network into the railroad technical system and from the railroad technical system to the external network.

In order not to allow everyone access to the railroad technical system, the gateway can comprise at least one key-operated switch by means of which the conversion facility for converting external network data into video signal connection data and/or device signal connection data of the railroad technical system can be embodied to be activated. Access in this direction should be classified as more critical so that the key-operated switch provides higher security against malicious access.

In a further advantageous embodiment, the gateway can comprise at least one authentication facility embodied to authenticate access on the part of the network adapter. This has the advantage that only authenticated people can gain access to the railroad technical system. This increases the security of the railroad technical system.

The gateway can further have at least one audit log facility embodied to record access actions on the part of the network adapter. This advantageous embodiment can also maintain the security of the railroad technical system at a high level because it is possible to trace exactly who had access to the railroad technical system via the gateway according to the invention even at a later date.

In order to be able to connect the gateway according to the invention in a particularly simple and uncomplicated manner, the gateway can be embodied as at least partially movable in a housing. The housing can in particular be embodied as an easy-to-handle carrying case that is, for example, connected to the railroad technical system by means of connecting cables, such as an HDMI cable and/or a USB cable.

In order to embody the gateway according to the invention as simply and inexpensively as possible, the gateway can have at least one first part that can be connected to a user and at least one second part that can be connected to the railroad technical system for establishing the device signal connection and/or video signal connection and the parts can be connected to one another by means of a network connection and arranged remotely from one another. Dividing the gateway according to the invention into two parts enables its practical implementation to be greatly simplified. For example, one part can be embodied within an existing company network that already has, for example, an authentication facility and/or audit log facility that can be used for the gateway according to the invention. In the second part, the features of the gateway according to the invention can be implemented—these are preferably positioned close to the railroad technical system, such as, for example, the conversion facility, the device signal adapter and the video signal adapter. This part can then be embodied in a mobile housing, such as a carrying case. The two parts can be connected by means of the network connection in the usual manner using known technology. In particular, the network connection between the parts can be embodied as a radio connection, in particular as an LTE connection.

In one advantageous embodiment of the method according to the invention, external network data can also be converted into video signal connection data and/or device signal connection data of the railroad technical system. This has the advantage already described above with reference to the gateway according to the invention that exchange is possible in both directions.

It is further possible for access on the part of the network adapter to be authenticated. This has the advantage, also described above, that every access is authenticated and hence only possible for trustworthy people.

In order to obtain an audit log of all instances of access, access actions on the part of the network adapter can be recorded.

Furthermore, a computer program product with program instructions for performing the method according to the invention and/or the exemplary embodiments thereof is claimed, wherein the computer program product can perform the method according to the invention and/or the exemplary embodiments thereof. For example, the computer program product can be formed by a computer that is part of the gateway according to the invention.

In addition, a providing apparatus for storing and/or providing the computer program product is claimed. The providing apparatus is, for example, a data carrier that stores and/or provides the computer program product. Alternatively and/or additionally, the providing apparatus is, for example, a network service, a computer system, a server system, in particular a distributed computer system, a cloud-based computer system and/or a virtual computer system, which stores and/or provides the computer program product, preferably in the form of a data stream.

The provision takes place, for example, as a download in the form of a program data block and/or instruction data block, preferably as a file, in particular a download file, or as a data stream, in particular a download data stream, of the complete computer program product. However, this provision can, for example, also take place as a partial download consisting of a plurality of parts which is in particular downloaded via a peer-to-peer network or provided as a data stream. Such a computer program product is, for example, read into a system using the providing apparatus in the form of the data carrier and executes the program instructions so that the method according to the invention is executed on a computer or the creating device is configured such that it forms the gateway according to the invention.

Other features which are considered as characteristic for the invention are set forth in the appended claims.

Although the invention is illustrated and described herein as embodied in a gateway and method for operating a gateway, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
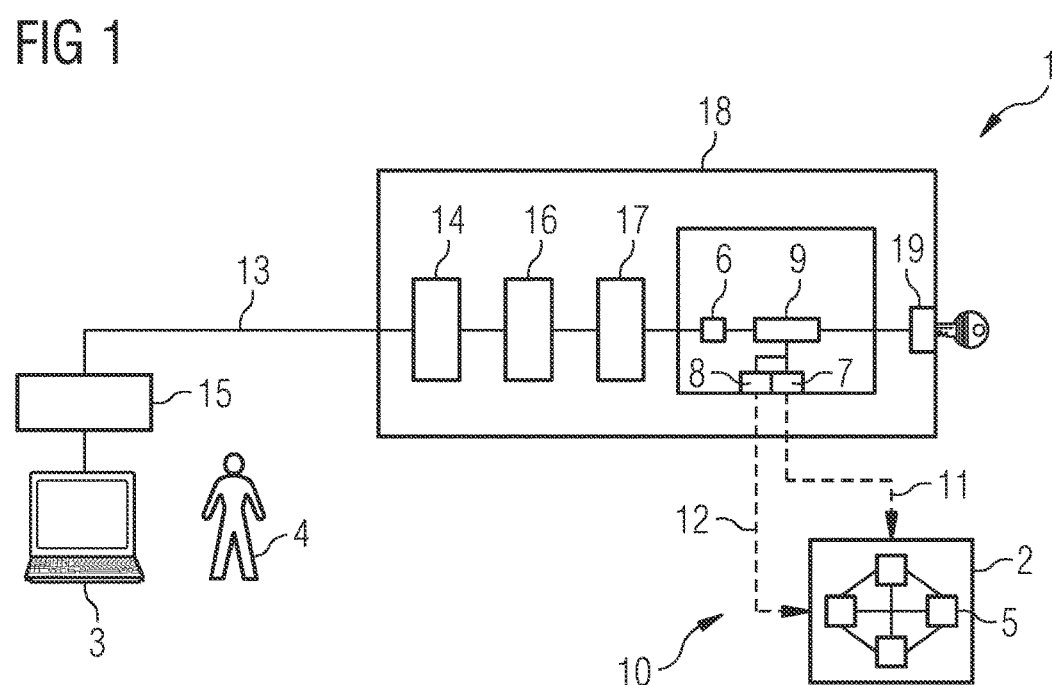
FIG. 1 is a schematic representation of an exemplary embodiment of a gateway according to the invention.

Referring now to the figures of the drawing in detail and first, in particular, to FIG. 1 thereof, there is shown an exemplary embodiment of a gateway 1 according to the invention, a railroad technical system 2, and the computer 3 of a user 4.

The railroad technical system 2 comprises, for example, at least one subway train, street car, mainline train, freight train, i.e., a wide variety of rail vehicles together with their route network and a signaling system that is responsible for vehicle control or train control. As is common in all modern railroad technical systems, the railroad technical system 2 in FIG. 1 also comprises a network 5 in which data is exchanged between different components. This can be a closed computer network, for example via Ethernet, that is executed in the usual manner.

In order to ensure the security of the railroad technical system 2, the network 5 within the railroad technical system 2 is embodied as a closed network 5. It is, for example, set up as a Category 2 network according to the standard EN 50159, for which special requirements apply regarding isolation. Simple network access to the railroad technical system network 2 from outside is not desired with the exemplary embodiment in FIG. 1 for security reasons.

Nevertheless, remote access of this kind by the user 4 by way of a computer 3 is still possible with the aid of the gateway 1 according to the invention, as described below. For the sake of simplicity, only the closed network of the railroad technical system 2 is shown in the figures.

In the exemplary embodiment in FIG. 1 The gateway 1 comprises a network adapter 6, a video signal adapter 7, a device signal adapter 8 and a conversion facility 9. The gateway 1 is connected to the railroad technical system 2 via signal lines 10. In particular, the video signal adapter 7 is connected to the network 5 of the railroad technical system 2 via an HDMI line 11 (HDMI=High-Definition Multimedia Interface) where it is connected to a corresponding video signal adapter (not shown) in the form of an HDMI connector. In the exemplary embodiment in FIG. 1, the device signal adapter 8 is connected to a corresponding device signal adapter (not shown), for example a USB connector, in the network 5 of the railroad technical system 2 via a USB line 12 (USB=Universal Serial Bus). Both can take place on a computer of the railroad technical system 2.

On the other hand, the gateway 1 according to the invention is connected to the user's 4 computer 3 by a network connection 13. Herein, the network connection 13 is connected to the network adapter 6 of the gateway 1. The network connection 13 is part of a non-illustrated external network embodied externally to the network 5 of the railroad technical system 2. The computer 3 also comprises a commercially available network adapter (not shown) to which the network connection 13 is connected. The user's 4 computer 3 is a commercially available computer such as, for example, a laptop with which a network connection 13 is possible. The network connection 13 can be wired, for example, via Ethernet, or can also be at least partially wireless via WLAN and Internet.

The gateway 1 according to the invention provides the user 4 with remote access to the network 5 of the railroad technical system 2 via the computer. However, there is no direct connection between the computer 3 and the network 5 of the railroad technical system 2. Rather, there is a protocol break in the gateway 1 so that the connection from the computer 3 could be described as indirect and in any case as having no repercussions for the network 5. This ensures a high level of security for the network 5 and the railroad technical system 2.

In the video signal adapter 7 of the gateway 1, video signals from the network 5 of the railroad technical system 2 arrive in the gateway 1 via the HDMI line 11. Since the conversion facility 9 is connected to the network adapter 6, the device signal adapter 8 and also the video signal adapter 7, the video signals from the network 5 are transmitted to the conversion facility 9.

The conversion facility 9 now converts the video signals, i.e., the data from the video signal connection with the network 5, into data that can be fed in the network connection 13 via the network adapter 6. This conversion of the data formats in the conversion facility 9 is performed by a microprocessor contained in the conversion facility 9. Herein, first the video signals from the network 5 are analyzed and then converted into data in a data format of the external network of the network connection 13. This could also be referred to as a translation. This conversion is necessary because the data format of the video signal connection at the video signal adapter 7 is different from the data format at the network adapter 6. This conversion of the data formats includes the protocol break that ensures security for the railroad technical system 2. Data from the network adapter 6 cannot be automatically fed into the network 5 by the video signal adapter 7 because the data formats are different. Thus, it would not be possible to transmit data without the conversion facility 9.

After the conversion of the data formats by the conversion facility 9, the video information from the network 5 can be transmitted via the network connection 13 to the computer 3 and displayed there. In this way, video information that would otherwise only be visible on display facilities within the network 5 of the railroad technical system is displayed to the user 4 on the computer 3, in particular on the monitor of the computer 3. Here, the selected connection between the video signal adapter 7 and the network 5 is, for example, the HDMI line 11 because this is common at the present time. Obviously, the connection can also be implemented with other video signal connections.

In particular, to enable the user 4 to make entries in the network 5 of the railroad technical system, the gateway 1 is also embodied to convert device signals. These device signals are generated in the usual way on the computer 3 by the user 4, for example in the form of keyboard entries or mouse movements or the like. These device signals are routed via the network connection 13 to the gateway 1 and in particular to the network adapter 6. These device signals are analyzed in the conversion facility 9 and converted by the conversion facility 9 into the appropriate data format for the device signal adapter 8. Here, another protocol break takes place, so that there is no direct connection to the network. In the exemplary embodiment 1 in FIG. 1, the device signal adapter 8 is embodied for the USB data format which is currently in general use. Of course, it is also possible for other data formats that are suitable for the device signals to be selected here.

These translated device signals are fed into the network 5 of the railroad technical system 2 via the USB line 12. In this way, the entries made by the user 4 reach the network 5 of the railroad technical system 2 via the gateway 1 according to the invention as if the user 4 were acting directly within the railroad technical system 2. Therefore, the conversion facility 9 of the gateway 1 according to the invention emulates the operating actions of the user 4 as performed on the remote computer 3. As a result, the operating actions of the user 4 appear as if they had been performed within the network 5.

In the exemplary embodiment in FIG. 1, the gateway 1 according to the invention furthermore comprises an encryption facility 14 for encrypting and decrypting the data transmitted via the network connection 13. Accordingly, an encryption facility 15 is also arranged on the side of the computer 3, so to speak on the other side of the network connection 13, where it encrypts or decrypts the data. Here, the encryption facilities 14, 15 operate in a known manner, for example with symmetric keys of the PKI system (PKI=Public Key Infrastructure).

In the exemplary embodiment in FIG. 1, the gateway 1 according to the invention furthermore comprises an authentication facility 16 and an audit log facility 17.

The authentication facility 16 is embodied to authenticate access to the network adapter 6 of the gateway 1. As a result, the user 4 has to be authenticated by means of a personal certificate so that it is possible to trace who has access to the network adapter 6.

The audit log facility 17 is embodied to record access actions on the part of the network adapter thereby providing increased security. The audit log facility records who has gained access to the network adapter 6. This is advantageous because it means that any subsequent access to the gateway according to the invention is also recorded. The protocol data generated by the audit log facility 17 can also be transmitted to a separate external location for storage.

In the exemplary embodiment in FIG. 1, the gateway 1 according to the invention is embodied in a common housing 18, in particular in a carrying case. This has the advantage, that the gateway 1 is mobile and easy to transport and is therefore easy to take to the vicinity of the railroad technical system 2 for connection thereto.

In the exemplary embodiment in FIG. 1, the gateway 1 according to the invention furthermore comprises a key-operated switch 19 by means of which the conversion facility 9 can be switched between two modes. In a first mode, there is only a unidirectional connection from the network 5 of the railroad technical system 2 in the direction of the network connection 13 and the user's 4 computer 3. Herein, only the video signal data is converted and transmitted via the video signal adapter 7 to the network adapter 6. Therefore, there is only a read mode. The transmission of device signals to the device signal adapter 8 and thus into the network 5 is interrupted. In the second mode, this direction of data transmission is activated so that there is a bidirectional connection to the network 5. Since the device signals can also trigger actions in the railroad technical system 2, this mode can also be referred to as an action mode.

In the following, the invention will be described with reference to the exemplary embodiment in FIG. 2. For the sake of simplicity, only the differences from the embodiment in FIG. 1 are discussed. The same or equivalent parts are identified by the same reference numerals.

Figure 2:
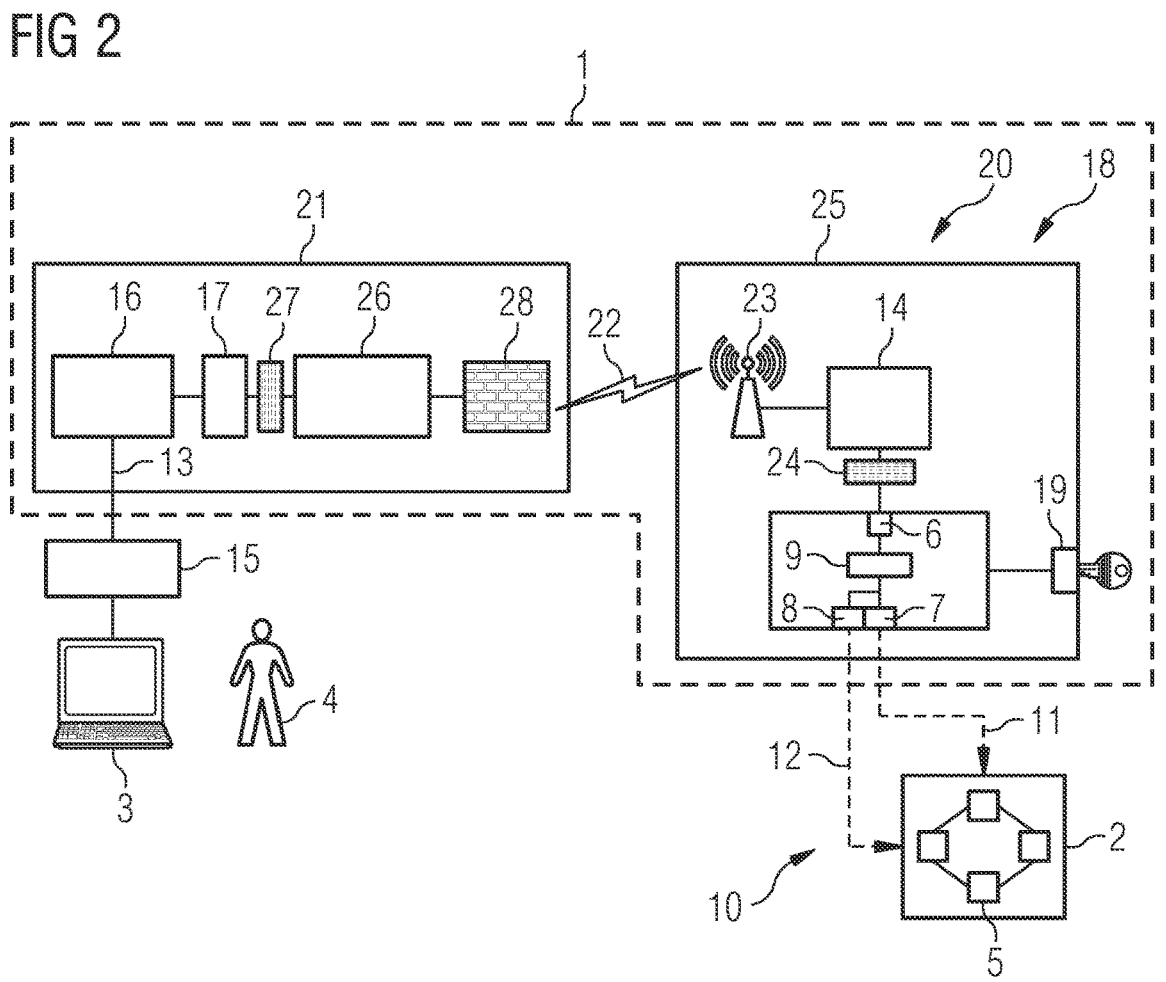
FIG. 2 is a schematic representation of a further exemplary embodiment of a gateway according to the invention.

In the exemplary embodiment in FIG. 2, the gateway 1 according to the invention comprises two parts. A first part 20 comprises the conversion facility 9, the network adapter 6, the video signal adapter 7 and the device signal adapter 8 and, as in the embodiment in FIG. 1, is connected via the signal line 10 to the network 5 of the railroad technical system 2. The second part 21 is connected to the user's 4 computer 3. The first part 20 and the second part 21 of the gateway 1 are arranged remotely from one another and, in the exemplary embodiment in FIG. 2, connected via a mobile network 22. For this purpose, the first part 20 comprises a mobile radio modem 23, which, in the embodiment in FIG. 2, is, for example, an LTE-Modem (LTE=Long Term Evolution, 4G LTE). Furthermore, the first part 20 of the gateway 1 comprises a firewall facility 24 for establishing a firewall between the network adapter 6 and the mobile radio modem 23. This increases security and prevents simple malicious attacks that may occur, for example, through the mobile network 22. Similarly to the embodiment in FIG. 1, the first part 20 of the gateway 1 is arranged in a housing 25 which is also embodied as a carrying case.

In the exemplary embodiment in FIG. 2, the second part 21 of the gateway 1 according to the invention is arranged in a stationary manner and is, for example, formed by an existing company network. In the exemplary embodiment in FIG. 2, the authentication facility 16 and the audit log facility 17 are provided in the second part 21. This is advantageous since these facilities are frequently already present in company networks and therefore can be used by the gateway 1 according to the invention. Furthermore, in the exemplary embodiment in FIG. 2, the second part 21 of the gateway 1 comprises a further encryption facility 26 and further firewall facilities 27 and 28.

In the embodiment in FIG. 2, the connection to the mobile network 22 from the second part 21 is established, for example by cable, via an operator of the mobile network 22. In the first part 20, the connection to the mobile network 22 is established via the mobile radio modem 23 which has been equipped by the operator of the mobile network 22 for this purpose, for example by means of a corresponding SIM card that enables access to the mobile network 22 (SIM=Subscriber Identify Module).

Figure 3:
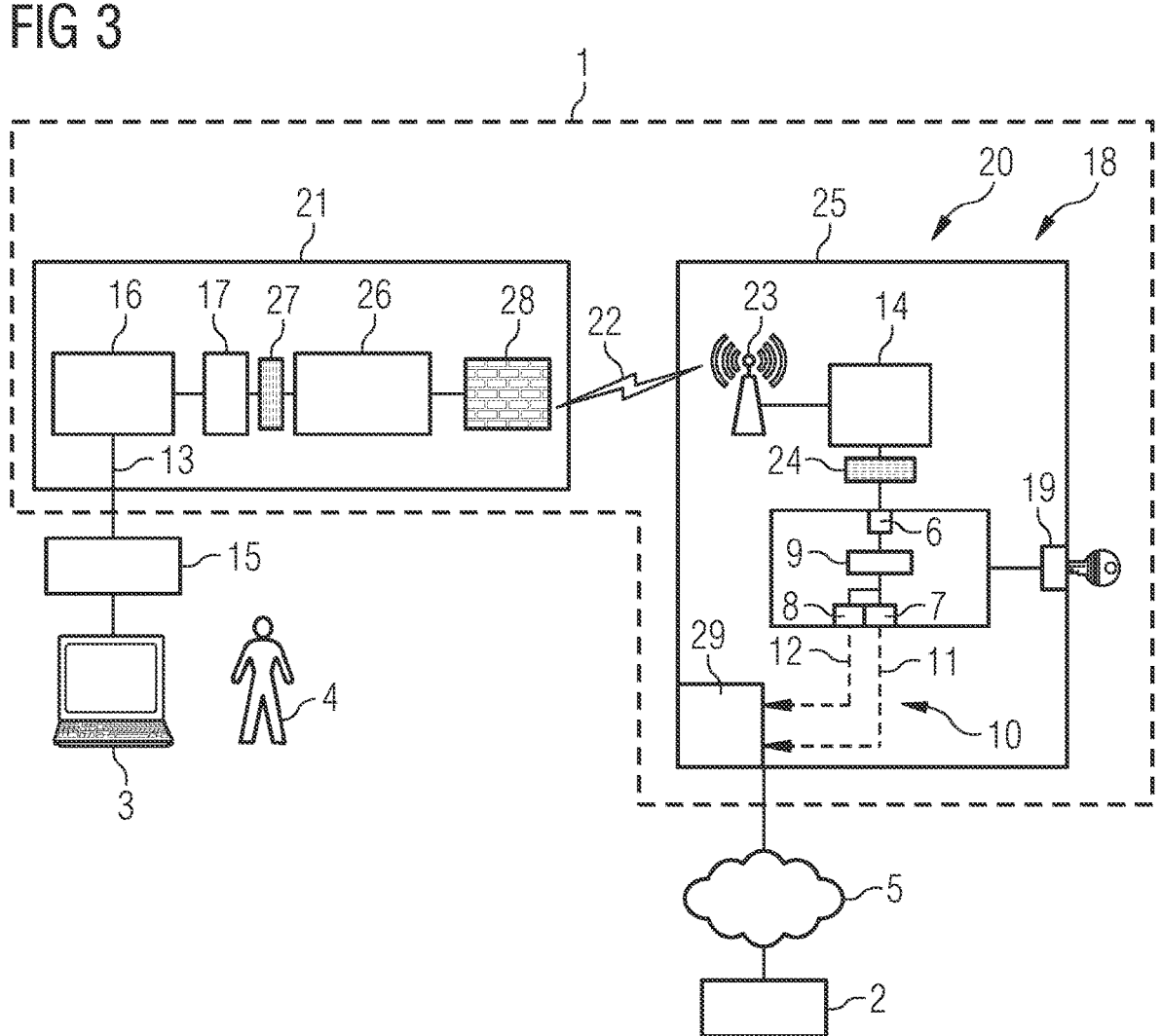
FIG. 3 is a schematic representation of a further exemplary embodiment of a gateway according to the invention.

In the following, the invention is described with reference to the further exemplary embodiments in FIG. 3. For the sake of simplicity, only the differences from the embodiment in FIG. 2 are discussed. The same reference numbers also designate the same parts.

In contrast to the embodiment in FIG. 2, the first part 20 of the gateway 1 according to the invention comprises an additional network computer 29 which is connected to the signal adapter 7 and the device adapter 8 via the signal lines 10. The network computer 29 is part of the network 5 of the railroad technical system 2. Hence, although the network computer 29 is arranged in the housing 25 of the gateway 1, at the same time it is a participant in the network 5 of the railroad technical system 2. Herein, the network computer 29 is completely spatially remote from the rest of the railroad technical system 2 and, for example, connected by a wireless or wired connection.

The invention claimed is:

1. A gateway for connection to a closed network of a railroad technical system, the gateway comprising:
 a network adapter for establishing a network connection to a network that is external to the network of the railroad technical system;
 at least one signal adapter selected from the group consisting of:
  a video signal adapter for establishing a video signal connection to the railroad technical system; and
  a device signal adapter for establishing a device signal connection to the railroad technical system; and

a conversion facility connected to both said network adapter and said at least one signal adapter, said conversion facility being configured to convert at least one of video signal connection data or device signal connection data of the railroad technical system into external network data;

said conversion facility being configured to create a protocol break between the external network and the closed network of the railway system, so that there is no direct connection between the external network and the closed network of the railway system; and said conversion facility having at least one microprocessor, said microprocessor being configured to convert data formats of said at least one of video signal connection data or device signal connection data.

2. The gateway according to claim 1, wherein said conversion facility is also embodied to convert external network data into video signal connection data or device signal connection data of the railroad technical system.

3. The gateway according to claim 2, further comprising at least one key-operated switch configured to enable said conversion facility for converting external network data into video signal connection data and/or device signal connection data of the railroad technical system to be activated.

4. The gateway according to claim 1, further comprising at least one authentication facility configured to authenticate access on the part of said network adapter.

5. The gateway according to claim 1, further comprising at least one audit log facility configured to record access actions on the part of said network adapter.

6. The gateway according to claim 1, wherein the gateway is embodied as at least partially movable in a housing.

7. The gateway according to claim 1, which comprises:

at least one first part to be connected to a user and at least one second part to be connected to the railroad technical system for establishing a signal connection by at least one of the device signal connection or the video signal connection; and wherein said at least one first part and said at least one second part are connected to one another by way of a network connection and are arranged remotely from one another.

8. The gateway according to claim 7, wherein the network connection between said first and second parts is a radio connection.

9. The gateway according to claim 8, wherein the network connection is a long term evolution connection.

10. A method for operating a gateway for connection to a closed network of a railroad technical system, the method comprising:

providing a gateway for connection to a closed network of a railroad technical system, the gateway having:

a network adapter for establishing a network connection to a network that is external to the network of the railroad technical system, at least one signal adapter selected from the group consisting of:

a video signal adapter for establishing a video signal connection to the railroad technical system, and a device signal adapter for establishing a device signal connection to the railroad technical system, and

a conversion facility connected to both said network adapter and said at least one signal adapter, said conversion facility being configured to convert at least one of video signal connection data or device signal connection data of the railroad technical system into external network data, and the conversion facility having at least one microprocessor; and creating, via the conversion facility, a protocol break between the external network and the closed network of the railway system, so that there is no direct connection between the external network and the closed network of the railway system; and receiving and converting at least one of video signal connection data or device signal connection data of the railroad technical system into external network data, converting data formats of the at least one of video signal connection data or device signal connection data via the at least one microprocessor.

11. The method according to claim 10, which comprises also converting external network data into at least one of video signal connection data or device signal connection data of the railroad technical system.

12. The method according to claim 10, which comprises authenticating access of the network adapter.

13. The method according to claim 10, which comprises recording access activity on the part of the network adapter.

14. A non-transitory computer-readable medium storing program instructions for performing a method for operating a gateway for connection to a closed network of a railroad technical system, wherein the gateway has:

a network adapter for establishing a network connection to a network that is external to the network of the railroad technical system, at least one signal adapter selected from the group consisting of:

a video signal adapter for establishing a video signal connection to the railroad technical system, and a device signal adapter for establishing a device signal connection to the railroad technical system, and a conversion facility connected to both said network adapter and said at least one signal adapter, said conversion facility being configured to convert at least one of video signal connection data or device signal connection data of the railroad technical system into external network data and the conversion facility having at least one microprocessor; and the method comprising:

receiving and converting at least one of video signal connection data or device signal connection data of the railroad technical system into external network data, converting data formats of the at least one of video signal connection data or device signal connection data via the at least one microprocessor; and creating, via the conversion facility, a protocol break between the external network and the closed network of the railway system, so that there is no direct connection between the external network and the closed network of the railway system.

15. The non-transitory computer-readable medium according to claim 14, wherein the program instructions are stored and/or loaded into a computer.

* * * * *